United States Patent
Mohamed

(10) Patent No.: US 7,377,752 B2
(45) Date of Patent: May 27, 2008

(54) WIND BLADE SPAR CAP AND METHOD OF MAKING

(75) Inventor: Mansour H. Mohamed, Raleigh, NC (US)

(73) Assignee: 3-Tex, Inc., Cary, NC (US)

(*) Notice: Subject to any disclaimer, the term of this patent is extended or adjusted under 35 U.S.C. 154(b) by 0 days.

(21) Appl. No.: 11/522,736

(22) Filed: Sep. 18, 2006

(65) Prior Publication Data

US 2007/0189902 A1 Aug. 16, 2007

Related U.S. Application Data

(63) Continuation of application No. 10/785,504, filed on Feb. 24, 2004, now abandoned.

(51) Int. Cl.
*F03D 11/00* (2006.01)
(52) U.S. Cl. ...................................... 416/226; 416/230
(58) Field of Classification Search ................ 416/226, 416/230, 241 A, 225
See application file for complete search history.

(56) References Cited

U.S. PATENT DOCUMENTS

| | | | |
|---|---|---|---|
| 5,279,892 A | 1/1994 | Baldwin et al. | 442/206 |
| 6,447,886 B1 | 9/2002 | Mohamed et al. | 428/209 |
| 6,457,943 B1 | 10/2002 | Olsen et al. | 416/230 |
| 7,198,471 B2 * | 4/2007 | Gunneskov et al. | 416/229 R |
| 2003/0138290 A1 | 7/2003 | Wobben | 403/293 |

* cited by examiner

*Primary Examiner*—Richard A. Edgar
(74) *Attorney, Agent, or Firm*—MacCord Mason PLLC

(57) ABSTRACT

A wind blade spar cap for strengthening a wind blade including an integral, unitary three-dimensional woven material having a first end and a second end, corresponding to a root end of the blade and a tip end of the blade, wherein the material tapers in width from the first to the second end while maintaining a constant thickness and decreasing weight therebetween, the cap being capable of being affixed to the blade for providing increased strength with controlled variation in weight from the root end to the tip end based upon the tapered width of the material thereof. The present inventions also include the method of making the wind blade spar cap and a wind blade including the wind blade spar cap.

15 Claims, 8 Drawing Sheets

WIND BLADE SPAR CAP AND METHOD OF MAKING

This application is a continuation of U.S. patent application Ser. No. 10/785,504, filed Feb. 24, 2004, now abandoned.

STATEMENT AS TO RIGHTS TO INVENTIONS MADE UNDER FEDERALLY-SPONSORED RESEARCH AND DEVELOPMENT

The invention was made in part with Federal funds from the Department of Energy.

FIELD OF THE INVENTION

The present invention is directed to wind blades, and more particularly, to wind blade design and manufacturing methods.

BACKGROUND OF THE PRIOR ART

The United States Department of Energy has set aggressive goals for increasing the use of wind power in the country. In order to achieve these goals, the Cost Of Energy (COE) must come down for wind power because it is not cost-competitive with other energy sources at this time. Currently, one of the most promising opportunities for significantly reduced COE is through the coordinated development of superior low-cost materials using reliable, high-volume component manufacturing techniques for components used in wind power applications. Rotors, usually consisting of two or three blades attached to a hub, represent the highest cost component of a wind turbine despite being less than 15% of its weight. Reducing blade weight has a dramatic weight-saving effect throughout the rest of the wind turbine. However, a careful balance must be achieved between reductions in blade weight and the higher costs typically associated with specialized lightweight materials such as carbon composites in order to realize reduced COE overall. Most large wind blades are currently made from glass fiber reinforced plastic (GFRP), with some sandwich core materials.

The value of lighter materials becomes a necessity when trying to scale to larger blades, and thus more efficient turbines. In scaling wind blade sizes from 40 m to 60 m in length, commercial blades at the upper end of the current size range are already nearing the limit of conventional designs from the standpoint of size, strength, and durability in operation over time. For large blades to avoid the near cubic weight increase with size, carbon or glass/carbon hybrid composites and manufacturing processes that yield better mean properties and/or reduced property scatter through improvements in fiber alignment, compaction and void reduction are required. This nonlinear increase of weight as a function of length/size was also discussed in references relevant in the art area.

While carbon fiber reinforced plastics (CFRP) have superior properties, such as about three times the stiffness with significantly better fatigue properties compared to GFRP, it also has a much higher cost. While commonly used E-glass costs less than USD$1/lb at the time of the application filing for letters patent of the present invention, standard modulus carbon fiber costs on the order of 6 to 20 $/lb, depending on type, tow-size and volume. As such, the present invention proposes a solution that provides a resultant product that is a hybridize of these two materials together to achieve an optimum design based on cost and performance. In general, the cost advantage or disadvantage of carbon fiber replacement will depend on the cost ratio of labor to materials. In order to take advantage of carbon properties compared with the prior art composites, new designs and manufacturing methods of the present invention provide for reduced labor time and therefore reduced costs, which now permit CFRP wind blades to be manufactured at a commercially competitive cost. From an industrial point of view, advantages of carbon fiber reinforced plastics/composites in blades according to the present invention include:

1. Thinner and more efficient profiles resulting in higher energy output,
2. Stiffer blade resulting in shorter nacelle,
3. More slender blades resulting in lower extreme loads on tower and nacelle, and
4. Lower blade mass resulting in easier to handle production and mounting.

The present invention includes materials, preferably 3-D woven hybrid glass-carbon and matrix materials, used in spar caps for wind blades, the spar caps made therefrom and the wind blades made therewith. Advantages of using these materials in such embodiments are discussed in the following in detail, and includes in summary: more efficient design approach using integral, unitary, single-piece variable width, with decreasing width from root to tip of the blade, spar caps and/or 3-D woven skins with variable density balsa behind and forward of the spar caps; and improved manufacturing processes including resin infusion of same, thereby leading to reduced labor cost and better quality control, as well as improved products and use thereof.

When it comes to core materials, Baltek Corporation of Northvale, N.J., USA is the world leader in balsa core materials. They have spent over 25 years of research perfecting end grain balsa materials. Genetically selected seeds are plantation grown in ideal conditions producing balsa trees with much improved consistency. Balsa core materials are used in many wind turbine blade designs today, and Baltek is a big player in this market. Current designs use only one density of core along the entire length of the blade. An improved structural efficiency can be obtained in a wind blade by tailoring the sandwich core to only the required density, which will vary along the length of the blade. To enable cost efficient manufacturing of the blades, the core materials can be pre-cut, labeled and "kitted" at the Baltek factory.

One of the most promising recently developed textile processes is a new form of 3D weaving being commercialized under the trademark 3-D woven by 3TEX, Inc. of Cary, N.C. USA. Embodiments of the present invention preferably include unitary, integral 3-D woven materials and/or 3-D weaving technology, as well as distinguishing its differences from 2-D weaving and previous 3-D weaving techniques.

A fully automated 3-D weaving process with multiple, simultaneous filling insertions was developed at the North Carolina State University College of Textiles, located in Raleigh, N.C. This process does not involve the building up of layers in the fabric; instead, a unit of thick, true 3-D fabric is formed during each weaving cycle.

There are at least three revolutionary advances contained within this process, including the automated use of multiple weft insertion in a single weaving cycle, the automated method of producing net-shaped forms in various cross-sectional shapes, including "I", "T" and "P" shapes, as well as core or pile structures, and the ability to include controlled amounts of Z direction fiber, for example up to ⅓ of the total fiber volume, in an integral and automated fashion.

Due to multiple filling insertions per weaving cycle, architectures can be achieved that cannot be done with conventional weaving. In addition to these advances, 3-D woven materials do not have internal fiber crimp, or interlacing at yarn intersections within the body of the material or fabric, which enhances fatigue performance over previously attempted conventional carbon materials in wind turbine blade applications. A schematic of the 3-D orthogonal woven structure is illustrated in FIG. 1.

The ability to make thicker/heavier fabrics with a controlled and uniform fiber architecture results in some inherent advantages for 3-D woven fabrics, including thicker fabrics for providing fewer required layers and less labor, faster resin infusion due to higher permeability for faster composite processing times, and low or no fiber crimp for higher in-plane properties (e.g. tension and compression), sufficient amounts of Z direction fibers providing for higher transverse shear strength and total suppression of delamination. Many of these advantages resulting from Z-direction fiber have been studied at the laboratory scale for years, as evidenced by the over 170 references cited in a review article. These advantages are realized in commercially available materials produced by 3TEX, Inc. of Cary, N.C. USA, which manufactures carbon and glass 3-D woven materials for applications in the marine and other industries.

The present invention applies these advantages with intelligent hybridization of carbon and glass for novel applications in wind blade spar cap design and construction, and methods therefore, which have not been taught or suggested in the prior art. Thus, prior to the present invention, there has remained a need in the art for hybrid carbon-glass composite spar caps for wind blades for providing increased stiffness and performance, with improved processing and reasonably competitive commercial costs.

SUMMARY OF THE INVENTION

A wind blade spar cap for strengthening a wind blade including an integral, unitary three-dimensional woven material having a first end and a second end, corresponding to a root end of the blade and a tip end of the blade, wherein the material tapers in width from the first to the second end while maintaining a constant thickness and decreasing weight therebetween, the cap being capable of being affixed to the blade for providing increased strength with controlled variation in weight from the root end to the tip end based upon the tapered width of the material thereof.

An integral, single-piece spar cap having constant thickness and variable width, preferably made from 3-D Woven Carbon/Glass Hybrid material for reducing rotor blade weight and manufacturing cost. An integral, single-piece spar cap having constant thickness and variable width, preferably made from 3-D woven Glass skin material, variable density balsa core sandwich component for reducing rotor blade weight and manufacturing cost. Methods of making the invention are also provided.

DETAILED DESCRIPTION OF THE INVENTION

Figure 1:
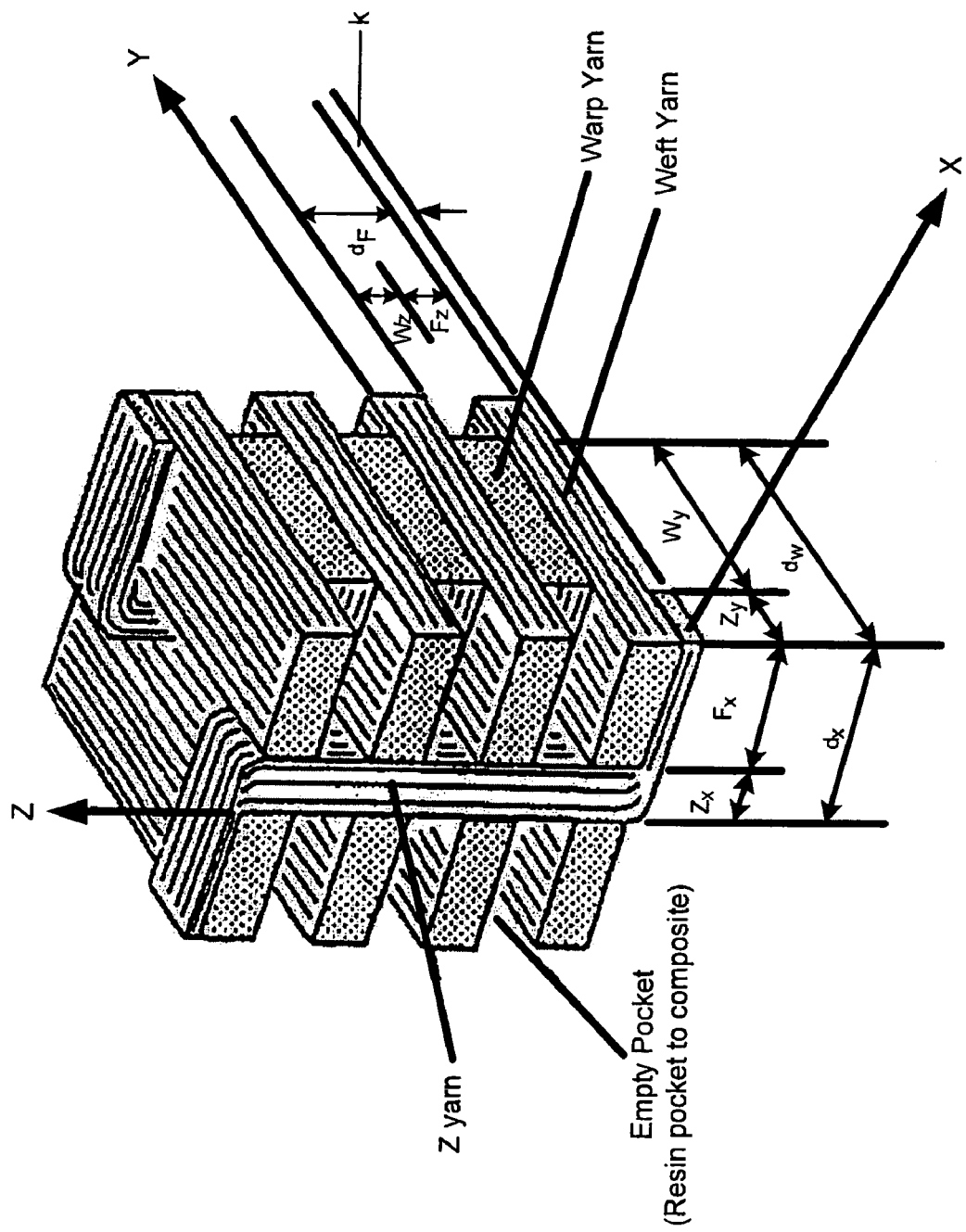
FIG. 1 shows a schematic of a 3-D orthogonal woven structure with unit cell geometry nomenclature constructed according to the present inventions.

Referring now to the drawings in general, the illustrations are for the purpose of describing a preferred embodiment of the invention and are not intended to limit the invention thereto.

Traditional spar cap designs and fabrication methods and associated limitations are overcome by the embodiments of the present invention set forth herein. The present invention provides for increased strength and stiffness of wind blades using spar caps formed of 3-D woven fabrics that are moldable and conformable to the wind blade shape and design, without negatively impacting aerodynamic qualities or increasing the weight of the blade. Delamination is also eliminated with the integral, unitary spar cap formed with a 3-D engineered fabric, preferably a 3-D woven fabric, according to the present invention that provides increased stiffness at the root and gradually decreases in weight and coverage moving from the root to the tip of the blade, all without using or incorporating plies of material.

In particular 3-D fabrics having predetermined, controllable, and adjustable thickness dimensions, which are held constant or substantially constant in preferred embodiments of the present invention, while cutting the material to vary the width, provides for new options, designs, and constructions for wind blade structures including spar caps. More particularly, 3-D woven thick performs used to form a tapered spar box that kept the thickness constant and varied the width over the length of the blade. This eliminates the current method of the prior art of dropping plies to vary the thickness between about 0.10 to about 0.50 inches, preferably about 0.25 inches thick, and thus eliminates the associated stress concentration points of wind blades having spar caps as represented in the prior art. It was also decided that a single layer of 3-D woven material could be used as a skin for the balsa sandwich in the areas aft and forward of the spar. This would provide for a more uniform composite skin and translate into more uniform properties. The density of the balsa may also adjusted throughout the blade as needed, for additional weight savings, in certain embodiments. In addition, the team identified that the thickness of the sandwich could be reduced to match the reduced thickness of the spar cap also resulting in less weight.

Therefore, two embodiments of the present invention are described and set forth herein: a constant thickness variable width spar cap design based on a single 3-D woven preform, and a 3-D woven skin, variable density balsa core sandwich structure.

The overall objectives of the present invention include products and methods using composites with hybrid carbon/glass 3-D woven material in the spar caps and/or in sandwich skins with balsa core for the cost-effective design and manufacture of large wind turbine blades.

Thus, one embodiment of the present invention provides an integral, single-piece spar cap having constant thickness and variable width for controlling blade strength, weight, and stiffness, as well as flexibility, preferably made from 3-D Woven Carbon/Glass Hybrid material for reducing rotor blade weight and manufacturing cost. Another embodiment of the present invention provides integral, single-piece spar cap having constant thickness and variable width, preferably made from 3-D woven glass skin material, variable density balsa core sandwich component for reducing rotor blade weight and manufacturing cost.

Still another aspect of the present invention provides methods of making the invention are also provided, wherein methods of making the 3-D woven spar cap include the steps of: providing a plurality of yarn systems for supplying input to a weaving machine;

introducing the yarn to the machine for manipulation in each of x-, y-, and z- directions, where the directions produce intersecting points;

forming an integral, unitary three-dimensional woven material having a predetermined, controlled thickness from the yarn where the x- and y-direction yarns are disposed to each other without interlacing, and where the z-direction yarns are manipulated to secure the x- and y-direction yarns in respective planes;

cutting the material to form a tapered spar cap section;

applying the tapered section to a wind blade such that the taper direction of the section decreases from a root end of the blade to a tip end of the blade.

The method preferably also further includes the step of introducing a resin to the section prior to applying it to the blade.

For varied size wind blades, the length, width, and/or thickness of the spar cap is selected based upon blade characteristic requirements and materials selected.

Figure 2:
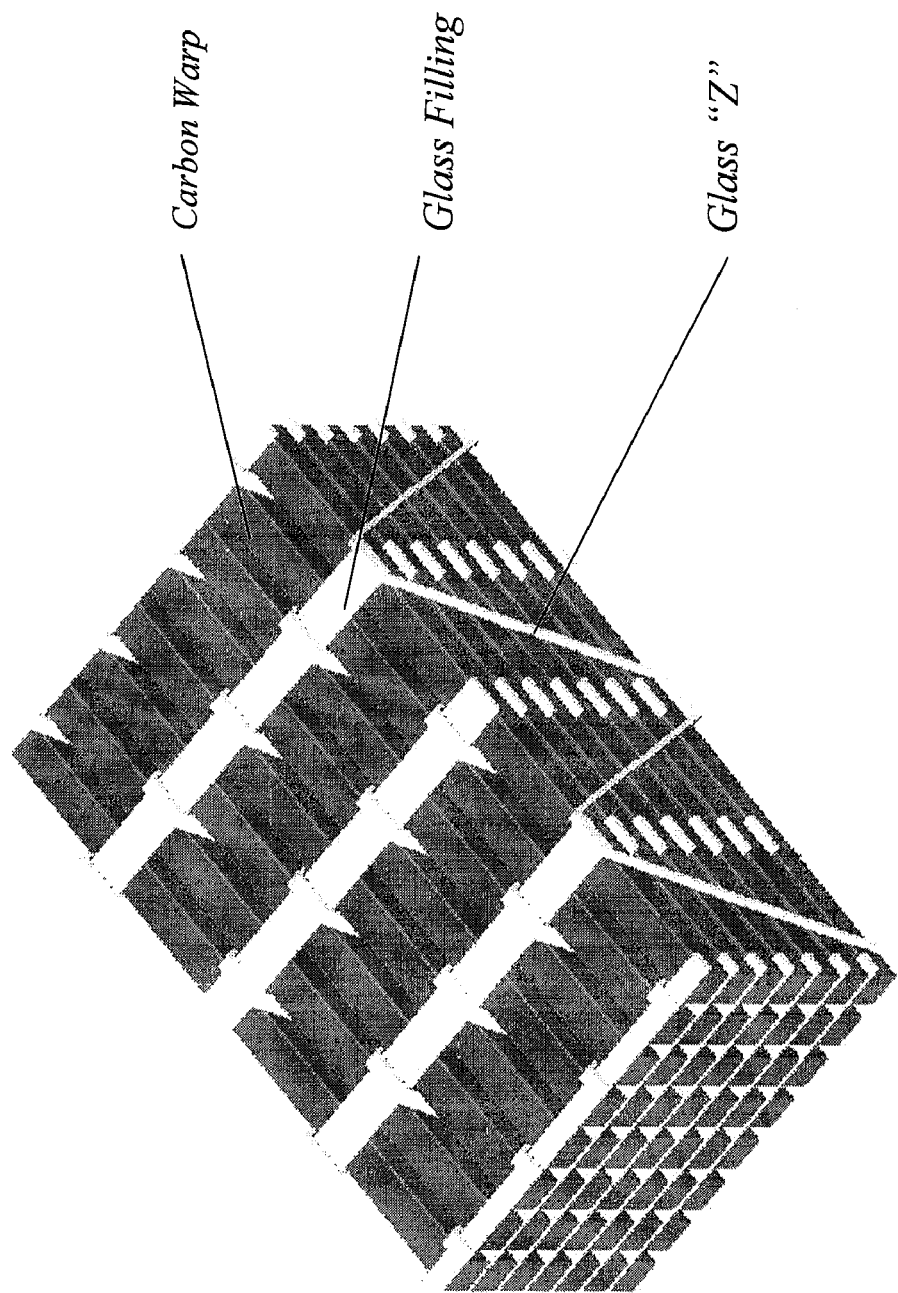
FIG. 2 shows a 3-D woven design having 100% carbon warp with glass filling and Z.

For the spar cap product and methods, carbon/glass hybrids are preferably used with two different hybridization approaches. In the first, the warp yarns (spar cap length direction) was 100% Toray T 700, 24 K carbon fiber, whereas the filling and Z yarns were PPG E-glass Hybon 2022, 1800 yield (see FIG. 2). The warp and Z yarns concentration was 10 per inch. All spar preforms were woven with 7 layers of warp and 8 layers of filling on one of 3TEX's automated 3-D weaving machines. Five preform designs were woven with the number of filling insertions per inch varied from 2.5 to 5 producing quasi-unidirectional materials having fiber weight distribution in the warp between 80.5% and 88.3%. The thickness was kept below 0.25" to meet the specifications of available tensile testing machines. Details of these materials are given in Table 1.

TABLE 1

First Set of Spar Cap 3-D Woven Fabrics

| Product Identification | Picks per Inch | Thickness Inch | Weight Oz/yd$^2$ | Fiber Volume Fraction % | | | | Distribution of Fiber Physical Weight % | | |
|---|---|---|---|---|---|---|---|---|---|---|
| | | | | $V_{fw}$ | $V_{ff}$ | $V_{fz}$ | Total $V_f$ | Warp | Filling | Z |
| P3W-HX050 | 2.5 | 0.228 | 151.9 | 43.7 | 2.96 | 1.2 | 47.8 | 88.3 | 8.4 | 3.3 |
| P3W-HX049 | 3 | 0.230 | 154.9 | 43.2 | 3.5 | 1.2 | 48 | 86.6 | 9.9 | 3.5 |
| P3W-HX048 | 3.5 | 0.233 | 157.9 | 42.8 | 4.1 | 1.3 | 48.1 | 85 | 11.4 | 3.6 |
| P3W-HX047 | 4 | 0.235 | 160.8 | 42.3 | 4.6 | 1.4 | 48.3 | 83.4 | 12.8 | 3.8 |
| P3W-HX046 | 5 | 0.240 | 166.7 | 41.4 | 5.6 | 1.5 | 48.5 | 80.4 | 15.4 | 4.2 |

Warp: 7 Layers, Carbon Toray T700, 24K, 10 ends/inch/layer.
Filling: 8 Layers (double insertion), E-Glass Hybon 2022, 1800 yield (1800 yd/lb).
Z-yarn: 10 ends/inch, E-Glass Hybon 2022, 1800 yield (1800 yd/lb).

Figure 3:
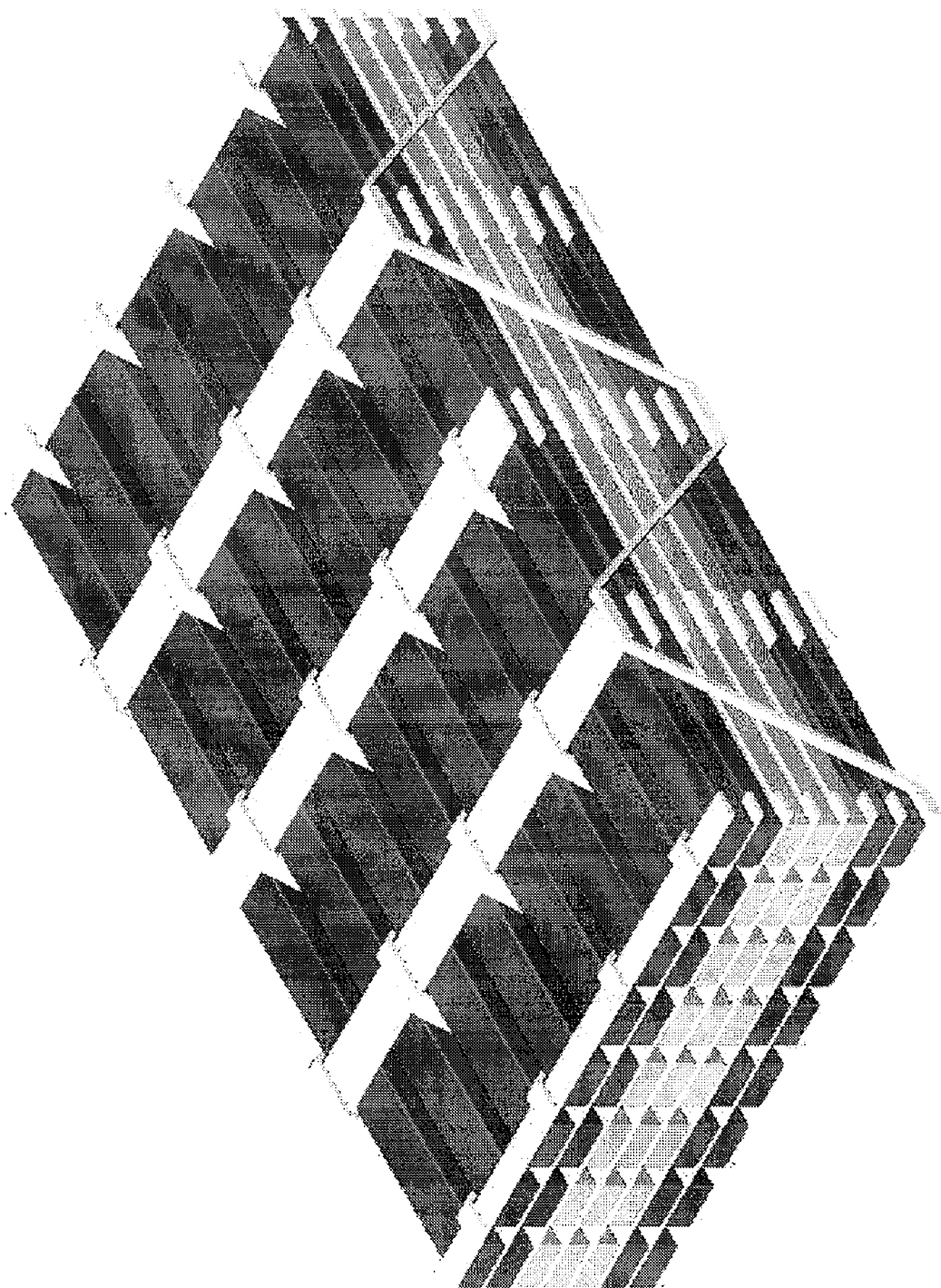
FIG. 3 shows a 3-D woven design having carbon/glass hybrid warp, glass filling and Z.
Figure 4:
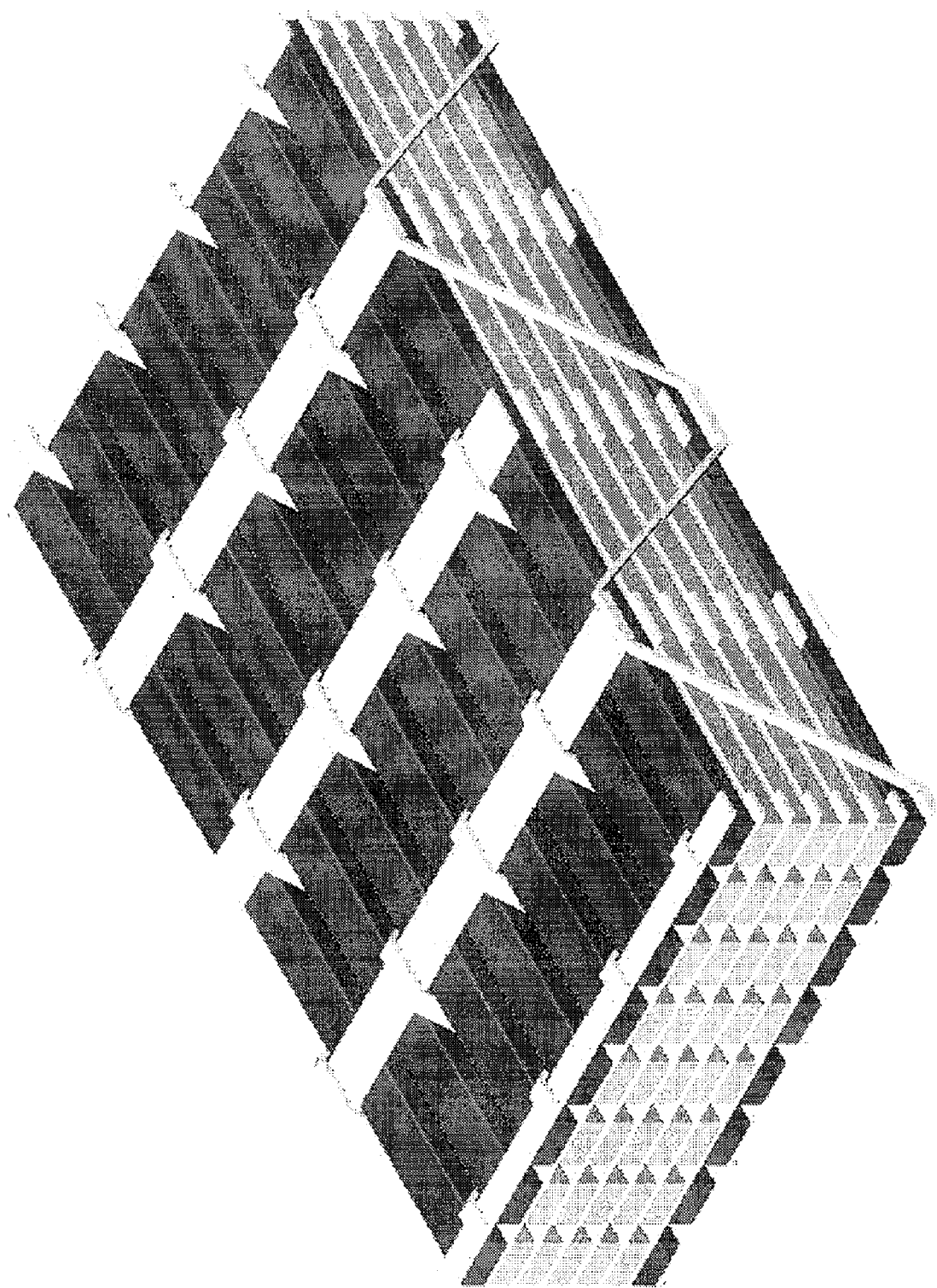
FIG. 4 shows a 3-D woven design having carbon/glass hybrid warp, glass filling and Z.

In the second approach, two hybrid arrangements were made. In one of them, carbon and glass were used in the warp direction in separate layers with three (FIG. 3a) and five layers (FIG. 3b) being glass. In the other design, carbon and glass fibers were mixed in alternating fashion in four layers (FIG. 3c). Only materials with 3 and 4 filling insertions per inch were produced since those with less than three insertions per inch were found to be difficult to handle during cutting and resin infusion. Details of these fabrics are given in Table 2 shown below.

TABLE 2

Second Set of Spar Cap 3-D woven Fabrics

| Product Identification | Warp Layers | | | Picks per Inch | Weight Oz/yd$^2$ | Thickness Inch | Fiber Volume Fraction % | | | | Distribution of Fiber Physical Weight % | | | |
|---|---|---|---|---|---|---|---|---|---|---|---|---|---|---|
| | Carbon | Glass | Mixed | | | | $V_{fw}$ | $V_{ff}$ | $V_{fz}$ | Total $V_f$ | Carbon | Glass | Filling | Z |
| P3W-HX052 | 4 | 3 | 0 | 3 | 176.7 | 0.23 | 42.1 | 3.5 | 1.2 | 46.8 | 43.1 | 45.0 | 8.7 | 3.1 |
| P3W-HX053 | 4 | 3 | 0 | 4 | 182.6 | 0.23 | 42.4 | 4.6 | 1.4 | 48.4 | 41.7 | 43.6 | 11.2 | 3.4 |
| P3W-HX054 | 2 | 1 | 4 | 3 | 176.7 | 0.23 | 42.1 | 3.5 | 1.2 | 46.8 | 43.1 | 45.0 | 8.7 | 3.1 |

TABLE 2-continued

Second Set of Spar Cap 3-D woven Fabrics

| Product Identification | Warp Layers | | | Picks per Inch | Weight Oz/yd² | Thickness Inch | Fiber Volume Fraction % | | | | Distribution of Fiber Physical Weight % | | | |
|---|---|---|---|---|---|---|---|---|---|---|---|---|---|---|
| | Carbon | Glass | Mixed | | | | $V_{fw}$ | $V_{ff}$ | $V_{fz}$ | Total $V_f$ | Warp Carbon | Glass | Filling | Z |
| P3W-HX055 | 2 | 1 | 4 | 4 | 182.6 | 0.23 | 42.4 | 4.6 | 1.4 | 48.4 | 41.7 | 43.6 | 11.2 | 3.4 |
| P3W-HX056 | 2 | 5 | 0 | 3 | 191.2 | 0.23 | 42.1 | 3.5 | 1.2 | 46.8 | 19.8 | 69.2 | 8.0 | 2.8 |
| P3W-HX057 | 2 | 5 | 0 | 4 | 197.0 | 0.23 | 42.3 | 4.7 | 1.4 | 48.4 | 19.2 | 67.2 | 10.4 | 3.1 |

Warp: 7 layers, Hybrid Carbon Toray T700, 24K, E-Glass Hybon 2022, 218 yield, 10 yarns/inch/layer
Filling: 8 layers (double insertion), E-Glass Hybon 2022, 1800 yield,
Z-yarn: 10 yarns/inch, E-Glass Hybon 2022, 1800 yield.

It is worth noting that a total fiber volume fraction in the preform of 48% results in about 55% fiber volume fraction in the composite due to the vacuum applied during the infusion process.

TABLE 3

Spar Cap 3-D woven Fabrics Measured Parameters

| Product ID | Fabric Areal Weight Oz/yd² | | Fabric Thickness Inch | |
|---|---|---|---|---|
| | Predicted | Measured | Predicted | Measured |
| P3W-HX046-12 | 166.70 | 170.94 | 0.24 | 0.24 |
| P3W-HX047-12 | 160.70 | 162.22 | 0.24 | 0.24 |
| P3W-HX048-12 | 157.70 | 160.05 | 0.23 | 0.22 |
| P3W-HX049-12 | 154.80 | 156.63 | 0.23 | 0.23 |
| P3W-HX050-12 | 151.80 | 153.73 | 0.23 | 0.23 |
| P3W-HX052-12 | 176.70 | 178.47 | 0.25 | 0.20 |
| P3W-HX053-12 | 182.60 | 184.71 | 0.25 | 0.22 |
| P3W-HX054-12 | 176.70 | 180.36 | 0.25 | 0.21 |
| P3W-HX055-12 | 182.60 | 185.18 | 0.25 | 0.21 |
| P3W-HX056-12 | 191.20 | 192.67 | 0.25 | 0.21 |
| P3W-HX057-12 | 197.00 | 198.85 | 0.25 | 0.21 |

A study was conducted as a parametric survey, examining a range of modulus of elasticity and determining the blade weight savings, which would result and the maximum material costs, which would prove economical. Detailed results are presented in the form of Tables.

Blade Model

As previously mentioned, the present study employs a sample blade design for a 37-m blade designed for a 1.5-MW wind turbine operating in IEC Class IIA conditions as the baseline for the current studies. The results presented here are relative to that design.

To facilitate rapid analysis, a structural model of the sample blade was built using software modeling; it was able to match the mass of the baseline blade to within 2% of "nominal", which is better than the reproducibility of the manufacturing method, and match the maximum tip deflection to within 1%. The model contains the following features:

Detailed definition of the geometry including chord length, twist, pitch axis offset in x and y, and 67 coordinates defining the airfoil geometry at each of 46 span wise locations from the root to the tip;

Modeling of nine different composite materials, including: Biaxial (±45°) glass fabric, unidirectional glass fabric, biaxial carbon fabric, unidirectional carbon fabric, thick 3-D woven for the spar caps, thin 3-D woven for the skins, epoxy resin, gel coat resin, balsa, and the like, and combinations thereof.

For each material the user can input the mass density, El stiffness, and cost per kilogram. For 3-D woven, a range of properties and costs were employed as part of the parametric study. For each composite construction, the user can independently control the fiber volume faction. For all 3-D woven modeling, a fiber volume fraction of 55% was employed.

Figure 5:
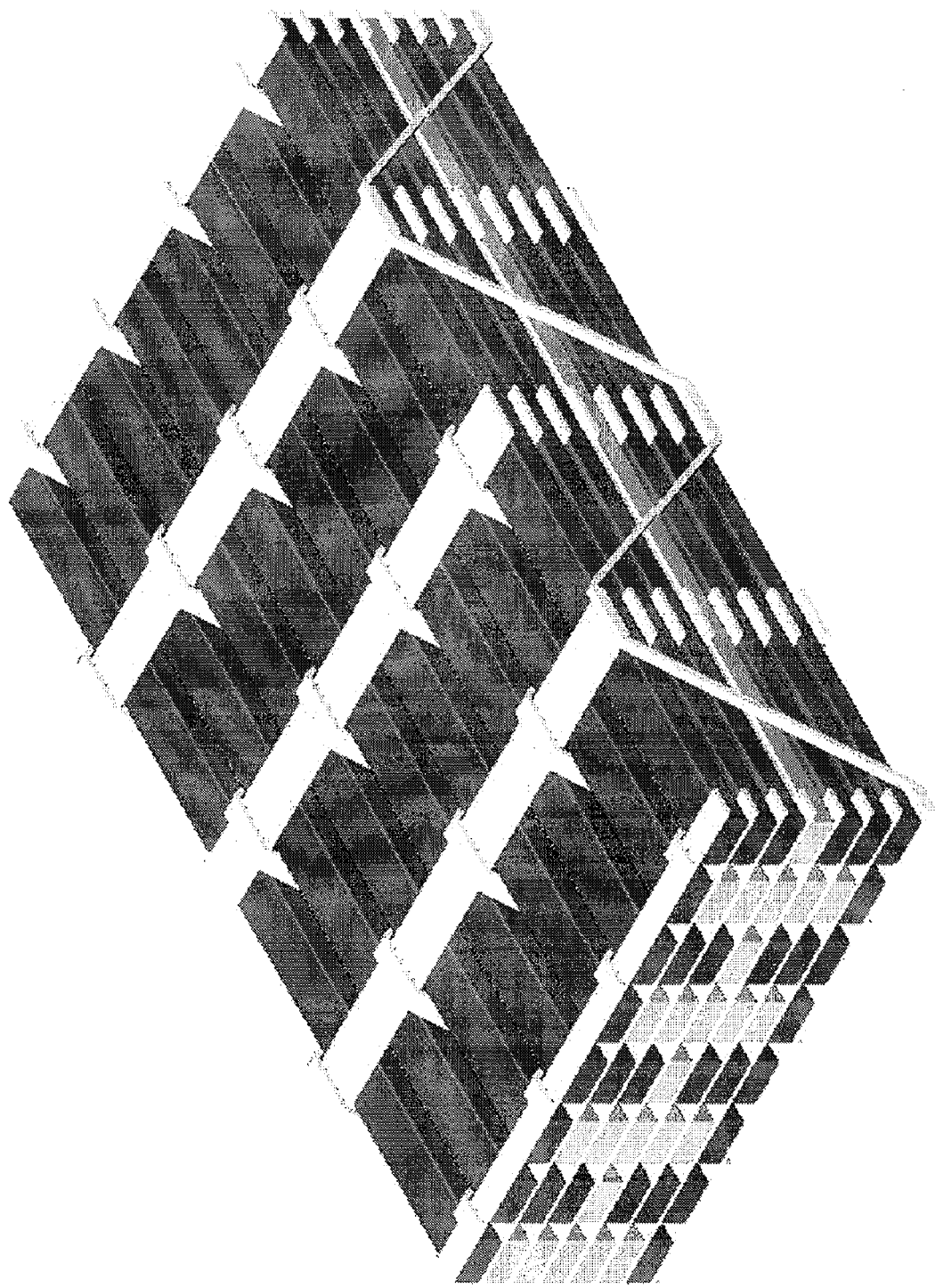
FIG. 5 shows a 3-D woven design having carbon/glass hybrid warp, glass filling and Z.

Modeling of eleven separate regions of laminate material at each spanwise station, see FIG. 5 upper surface spar cap. The width of the spar cap is set at the z=9215 mm station (maximum chord length) and at the tip. The width is assumed to taper linearly in between. Inboard of z=9215, the spar cap is assumed to be constant width. The spar cap is automatically placed centered on the pitch axis (y=0).

Alternative constructions of the present invention include the following and combinations thereof:

Lower surface spar cap, which is assumed to be identical to the upper surface spar cap.

Balsa forward of the upper surface spar cap

Balsa aft of the upper surface spar cap

Balsa forward of the lower surface spar cap

Balsa aft of the lower spar cap

Skins, which can include unidirectional and biaxial glass fabric, unidirectional and biaxial carbon fabric, and thin 3-D woven. The thickness of each can be controlled independently.

Leading edge tape, which remains unchanged from the baseline blade;

Trailing edge tape, which remains unchanged from the baseline blade.

Forward shear web, which remains unchanged from the baseline blade.

Aft shear web, which remains unchanged.

3-D Woven Spar Cap

A variety of materials and their costs, which would permit their economical use in a blade, were examined. In the first series of analyses, we examined only changes to the spar cap. The skins, shear webs, and leading and trailing edge tapes were unchanged. The balsa thickness distribution was unchanged, but the width of the balsa was automatically adjusted to conform to the changes in the spar cap width.

The blade load distribution corresponding to the maximum tip deflection was applied. It should be noted that maximum tip deflection of a real wind turbine results from the dynamics of the turbine, which are not only a function of instantaneous (i.e. quasi static) loading but also the dynamics of the loading and the various natural frequencies of the turbine. The load distribution employed here is the static loading, which results in the same blade deflection.

However, it should be noted that since the dynamics of a different rotor blade would be different, this loading would not be invariant as the blade design is changed. For example, reducing blade mass without changing the blade stiffness will generally result in a slight increase in tip deflection due to loss of mass damping. Therefore, the loading would have to be increased slightly to account for this effect. The loading distribution was not changed. It should be understood, however, that lighter blades might have to be slightly stiffened beyond what is reported in this study in order to compensate for the loss of mass damping.

Non-uniform loading of the blade in different locations along the length of the blade make the 3-D woven spar cap embodiments of the present invention best suited for balancing a mix or hybridization of materials, while ensuring a uniform, integral spar cap having decreasing width from blade root end to the tip end, all while providing substantially constant thickness.

Furthermore, the balance of materials and structure between carbon in the X- or warp direction and E-glass in the Y- or filling direction at different concentrations or densities provides for optimization of the strength, weight, stiffness/flexibility characteristics, as well as providing a means for controlling and improving resin infusion flow throughout the material prior to application of the spar cap to the blade.

Fatigue damage equivalent loads were applied to a few of the configurations, and the fatigue properties of 3-D woven materials were determined through testing.

Three geometric parameters which were controlled in providing a spar cap for a wind blade application include the root width, $w_{root}$, tip width, $w_{tip}$, and the thickness, t. If $w_{root}$ and $w_{tip}$ are specified then the thickness, t, is determined solely by the modulus of elasticity, $E_{11}$, of the spar cap 3-D woven material. The design constraint imposed is that the tip deflection cannot exceed the baseline value.

Using available data, it is assumed that a raw strain limit for carbon is 8,000 μstrain. Knockdowns or safety factors for composite properties as required by Germanischer Lloyd typically add to approximately 2.7, which would reduce the allowable strain limit to approximately 3,000 μstrain. All of the designs produced here remained under that limit. However, that limit should be rechecked once test data is available.

In all of the analyses, a fiber volume fraction of 55% was assumed. Values for the "fiber" modulus of elasticity, $E_{11}$, between 60 and 202.5 GPa were employed. Assuming an epoxy $E_{11}$ of 3.1 GPa, this resulted in composite moduli between 34 and 113 GPa (5.0 and 16.4 Msi).

Design Optimization Summaries

Table 4 summarizes the results of the analyses for the 43 cases examined. This table can be used to determine the required composite thickness for a given combination of root and tip width and 3-D woven composite stiffness. This is the thickness required to maintain tip deflection at the baseline value. Table 4 also lists the corresponding maximum strain values. It can be seen that everywhere they remain below 3,000 μstrain.

Since the 3-D woven might be a mix of carbon and glass fibers, the average fiber density could lie anywhere between 1.8 and 2.6 g/cc. Please note that the density listed in the table refers to the fiber density, not the composite density. For a given average fiber density, Table 4 lists the corresponding fabric weight.

The relative cost column requires some explanation. For each value of the modulus, $E_{11}$, the cost of the 3-D woven fabric was adjusted so that the best configuration equaled the baseline cost. For each value of $E_{11}$, the best configuration is shown in bold. The cost of the other configurations over the baseline, using the same cost for 3-D woven, is reflected in Table 5 as a percentage of the baseline cost.

The principal conclusion to be drawn from the results in Table 4 is that a spar cap root width between 750 and 1,000 mm is optimal over the entire range of stiffness values examined here, with the most optimal root width increasing from 750 to 1,000 mm as the stiffness is reduced. As the modulus of the spar cap is reduced, a thicker spar cap is required. Over much of the blade, this leads to a relatively less efficient use of material, which pushes the optimal design to a wider, thinner spar cap as the stiffness is reduced.

The cost is not terribly sensitive over a range of 250 mm either side of the optimal. That is, at the highest values for the stiffness, the optimal range is from 500 to 1,000 mm, while for the low stiffness, the optimal range is 750 to 1,250 mm. The results are negligibly sensitive to the spar cap tip width over the range from 75 to 200 mm. For tip widths greater than 200 mm, the cost does begin to increase.

Substantially increasing the stiffness will result in a significant reduction in blade weight. For a composite stiffness of 16 Msi, reductions in weight from the baseline wet hand lay-up blade of between 30 and 33% are attainable, and reductions relative to the resin-infused baseline blade of between 20% and 25% are attainable, depending upon the density of the spar cap 3-D woven fabric.

The weight reductions are still substantial, down to composite stiffness values of 6.6 Msi relative to the wet hand lay-up blade, but are marginal at that level compared to the resin-infused baseline blade. Since this stiffness value is roughly equal to that of the resin-infused baseline blade unidirectional glass composite material, it suggests that the constant-thickness 3-D woven spar does not offer substantial advantages in glass. Instead, the concept may offer the best advantages in carbon or carbon/glass hybrids. In fact, at the lowest composite stiffness level of 5 Msi, the concept results in an increase in blade mass. It will be seen later that the chosen design for the Spar Cap has a 100% carbon warp and then glass filling and Z. Mixing of carbon and glass in the same direction requires thicker composites making for heavy blades.

TABLE 4

Summary of 3-D woven Spar Cap Design Optimization Efforts, 37-m Blade for IEC Class IIA

| Case | Composite Stiffness in the Warp Direction $E_{11,composite}$ GPa | Msi | Spar Cap Width at the Root $w_{root}$ mm | in | Spar Cap Width at the Tip $w_{tip}$ mm | in | Composite Thickness $t_{composite}$ mm | in | Maximum Strain $\mu_{strain}$ | Cost Relative to Cheapest for same $E_{11}$ |
|---|---|---|---|---|---|---|---|---|---|---|
| 1 | 113 | 16.4 | 400 | 15.75 | 75 | 2.95 | 17.9 | 0.70 | 2,552 | 0.5% |
| 2 | 113 | 16.4 | 500 | 19.69 | 75 | 2.95 | 14.5 | 0.57 | 2,526 | 0.2% |
| 3 | 113 | 16.4 | 500 | 19.69 | 100 | 3.94 | 14.1 | 0.55 | 2,577 | 0.1% |
| 4 | 113 | 16.4 | 500 | 19.69 | 125 | 4.92 | 13.7 | 0.54 | 2,623 | 0.1% |
| 5 | 113 | 16.4 | 500 | 19.69 | 150 | 5.91 | 13.4 | 0.53 | 2,665 | 0.1% |
| 6 | 113 | 16.4 | 500 | 19.69 | 200 | 7.87 | 12.8 | 0.51 | 2,726 | 0.2% |
| 7 | 113 | 16.4 | 600 | 23.62 | 75 | 2.95 | 12.4 | 0.49 | 2,531 | 0.2% |
| 8 | 113 | 16.4 | 750 | 29.53 | 75 | 2.95 | 10.2 | 0.40 | 2,500 | 0.1% |
| 9 | 113 | 16.4 | 750 | 29.53 | 100 | 3.94 | 9.9 | 0.39 | 2,537 | 0.0% |
| 10 | 113 | 16.4 | 750 | 29.53 | 125 | 4.92 | 9.8 | 0.38 | 2,569 | 0.0% |
| 11 | 113 | 16.4 | 750 | 29.53 | 150 | 5.91 | 9.6 | 0.38 | 2,600 | 0.0% |
| 12 | 113 | 16.4 | 750 | 29.53 | 200 | 7.87 | 9.3 | 0.36 | 2,657 | 0.0% |
| 13 | 113 | 16.4 | 1000 | 39.37 | 75 | 2.95 | 8.0 | 0.32 | 2,517 | 0.3% |
| 14 | 113 | 16.4 | 1000 | 39.37 | 125 | 4.92 | 7.8 | 0.31 | 2,562 | 0.3% |
| 15 | 113 | 16.4 | 1000 | 39.37 | 175 | 6.89 | 7.6 | 0.30 | 2,603 | 0.3% |
| 16 | 113 | 16.4 | 1250 | 49.21 | 75 | 2.95 | 6.9 | 0.27 | 2,541 | 0.9% |
| 17 | 113 | 16.4 | 1250 | 49.21 | 125 | 4.92 | 6.7 | 0.26 | 2,577 | 0.9% |
| 18 | 113 | 16.4 | 1250 | 49.21 | 175 | 6.89 | 6.6 | 0.26 | 2,607 | 0.9% |
| 19 | 113 | 16.4 | 1400 | 55.12 | 125 | 4.92 | 6.3 | 0.25 | 2,591 | 1.4% |
| 20 | 113 | 16.4 | 1500 | 59.06 | 61 | 2.40 | 6.2 | 0.24 | 2,567 | 2.0% |
| 21 | 113 | 16.4 | 1500 | 59.06 | 175 | 6.89 | 6.0 | 0.24 | 2,627 | 1.9% |
| 22 | 113 | 16.4 | 1550 | 61.02 | 75 | 2.95 | 6.1 | 0.24 | 2,584 | 2.0% |
| 23 | 113 | 16.4 | 1550 | 61.02 | 125 | 4.92 | 6.0 | 0.24 | 2,609 | 2.0% |
| 24 | 113 | 16.4 | 1550 | 61.02 | 175 | 6.89 | 5.9 | 0.23 | 2,631 | 2.2% |
| 25 | 89 | 13.0 | 500 | 19.69 | 75 | 2.95 | 18.7 | 0.74 | 2,511 | 0.3% |
| 26 | 89 | 13.0 | 750 | 29.53 | 61 | 2.40 | 13.2 | 0.52 | 2,474 | 0.2% |
| 27 | 89 | 13.0 | 750 | 29.53 | 75 | 2.95 | 12.9 | 0.51 | 2,494 | 0.0% |
| 28 | 89 | 13.0 | 750 | 29.53 | 100 | 3.94 | 12.7 | 0.50 | 2,528 | 0.1% |
| 29 | 89 | 13.0 | 1000 | 39.37 | 75 | 2.95 | 10.2 | 0.40 | 2,514 | 0.3% |
| 30 | 89 | 13.0 | 1250 | 49.21 | 75 | 2.95 | 8.7 | 0.34 | 2,538 | 0.8% |
| 31 | 67 | 9.8 | 500 | 19.69 | 75 | 2.95 | 25.7 | 1.01 | 2,486 | 0.5% |
| 32 | 67 | 9.8 | 750 | 29.53 | 75 | 2.95 | 17.7 | 0.70 | 2,479 | 0.1% |
| 33 | 67 | 9.8 | 750 | 29.53 | 100 | 3.94 | 17.3 | 0.68 | 2,512 | 0.0% |
| 34 | 67 | 9.8 | 1000 | 39.37 | 75 | 2.95 | 13.8 | 0.54 | 2,502 | 0.1% |
| 35 | 67 | 9.8 | 1250 | 49.21 | 75 | 2.95 | 11.8 | 0.46 | 2,529 | 0.6% |
| 36 | 45 | 6.6 | 750 | 29.53 | 75 | 2.95 | 27.7 | 1.09 | 2,445 | 0.2% |
| 37 | 45 | 6.6 | 750 | 29.53 | 100 | 3.94 | 27.1 | 1.06 | 2,480 | 0.1% |
| 38 | 45 | 6.6 | 1000 | 39.37 | 75 | 2.95 | 21.4 | 0.84 | 2,478 | 0.0% |
| 39 | 45 | 6.6 | 1000 | 39.37 | 100 | 3.94 | 21.1 | 0.83 | 2,503 | 0.0% |
| 40 | 45 | 6.6 | 1250 | 49.21 | 75 | 2.95 | 18.1 | 0.71 | 2,508 | 0.4% |
| 41 | 34 | 5.0 | 750 | 29.53 | 100 | 3.94 | 38.0 | 1.49 | 2,440 | 0.4% |
| 42 | 34 | 5.0 | 1000 | 39.37 | 100 | 3.94 | 29.1 | 1.15 | 2,475 | 0.0% |
| 43 | 34 | 5.0 | 1250 | 49.21 | 100 | 3.94 | 24.6 | 0.97 | 2,505 | 0.2% |

| Case | Cloth Weight For Average Fiber Densities of 1.8 g/cc oz/yd² | 2.0 g/cc | 2.2 g/cc | 2.4 g/cc | 2.6 g/cc | Change in Blade Mass, Relative to Wet Hand Layup Baseline | Change in Blade Mass, Relative to Resin Infusion Baseline |
|---|---|---|---|---|---|---|---|
| 1 | 522 | 580 | 638 | 696 | 754 | −32% to −29% | −24% to −20% |
| 2 | 423 | 470 | 517 | 564 | 611 | −32% to −30% | −24% to −21% |
| 3 | 411 | 456 | 502 | 547 | 593 | −32% to −30% | −24% to −21% |
| 4 | 400 | 444 | 489 | 533 | 577 | −32% to −30% | −24% to −21% |
| 5 | 390 | 433 | 476 | 520 | 563 | −32% to −30% | −24% to −21% |
| 6 | 375 | 416 | 458 | 499 | 541 | −32% to −30% | −24% to −21% |
| 7 | 362 | 403 | 443 | 483 | 523 | −32% to −30% | −24% to −21% |
| 8 | 296 | 329 | 362 | 395 | 428 | −33% to −30% | −24% to −21% |
| 9 | 290 | 322 | 354 | 387 | 419 | −33% to −30% | −25% to −21% |
| 10 | 285 | 316 | 348 | 380 | 411 | −33% to −30% | −25% to −22% |
| 11 | 280 | 311 | 342 | 373 | 404 | −33% to −30% | −25% to −22% |
| 12 | 271 | 301 | 331 | 361 | 391 | −33% to −30% | −25% to −22% |
| 13 | 234 | 261 | 287 | 313 | 339 | −33% to −30% | −25% to −22% |
| 14 | 228 | 253 | 279 | 304 | 329 | −33% to −30% | −25% to −22% |
| 15 | 223 | 248 | 272 | 297 | 322 | −33% to −30% | −25% to −22% |
| 16 | 201 | 223 | 245 | 267 | 290 | −33% to −30% | −25% to −21% |
| 17 | 197 | 218 | 240 | 262 | 284 | −33% to −30% | −25% to −22% |
| 18 | 193 | 214 | 236 | 257 | 279 | −33% to −30% | −25% to −22% |
| 19 | 184 | 204 | 225 | 245 | 266 | −33% to −30% | −25% to −21% |
| 20 | 181 | 201 | 222 | 242 | 262 | −33% to −30% | −25% to −21% |
| 21 | 176 | 195 | 215 | 234 | 254 | −33% to −30% | −25% to −21% |
| 22 | 178 | 197 | 217 | 237 | 256 | −33% to −30% | −25% to −21% |

TABLE 4-continued

Summary of 3-D woven Spar Cap Design Optimization Efforts, 37-m Blade for IEC Class IIA

| | | | | | | | |
|---|---|---|---|---|---|---|---|
| 23 | 175 | 195 | 214 | 234 | 253 | −33% to −30% | −25% to −21% |
| 24 | 173 | 192 | 212 | 231 | 250 | −33% to −30% | −25% to −21% |
| 25 | 545 | 606 | 667 | 727 | 788 | −30% to −26% | −21% to −17% |
| 26 | 384 | 427 | 469 | 512 | 555 | −30% to −27% | −21% to −17% |
| 27 | 376 | 418 | 460 | 502 | 544 | −30% to −27% | −22% to −18% |
| 28 | 371 | 413 | 454 | 495 | 536 | −30% to −27% | −22% to −18% |
| 29 | 299 | 332 | 365 | 398 | 431 | −30% to −27% | −22% to −18% |
| 30 | 255 | 284 | 312 | 340 | 369 | −30% to −26% | −22% to −17% |
| 31 | 751 | 835 | 918 | 1,002 | 1,085 | −25% to −20% | −16% to −11% |
| 32 | 516 | 573 | 630 | 688 | 745 | −26% to −21% | −17% to −11% |
| 33 | 505 | 561 | 617 | 673 | 729 | −26% to −21% | −17% to −11% |
| 34 | 404 | 449 | 494 | 539 | 584 | −26% to −21% | −17% to −11% |
| 35 | 344 | 383 | 421 | 459 | 497 | −26% to −21% | −17% to −11% |
| 36 | 809 | 898 | 988 | 1,078 | 1,168 | −17% to −9% | −6% to 2% |
| 37 | 790 | 878 | 965 | 1,053 | 1,141 | −17% to −9% | −6% to 2% |
| 38 | 626 | 695 | 765 | 834 | 904 | −17% to −9% | −7% to 2% |
| 39 | 616 | 684 | 753 | 821 | 889 | −17% to −9% | −7% to 2% |
| 40 | 529 | 588 | 647 | 706 | 765 | −16% to −8% | −6% to 3% |
| 41 | 1,109 | 1,232 | 1,355 | 1,478 | 1,601 | −7% to 4% | 5% to 17% |
| 42 | 850 | 945 | 1,039 | 1,134 | 1,228 | −7% to 3% | 4% to 16% |
| 43 | 717 | 797 | 877 | 957 | 1,036 | −6% to 5% | 5% to 18% |

All Designs assume a fiber volume fraction of 55% and are designed for the same maximum tip deflection as the GE37a blade under the same static equivalent loading.

The reason is fairly easy to understand. The constant thickness 3-D woven configuration matches the baseline fairly well over most of the blade but is overly stiff at the tip. This is impossible to avoid with any reasonable spar tip width. The problem is most severe with less stiff material, where the thickness at the tip becomes excessive.

3-D woven Economics, Relative to Wet Hand Lay-up Baseline

Table 5 lists the maximum economic fabric costs as a function of the average fiber density and the composite modulus of elasticity (assuming a fiber volume fraction of 55%). These can be interpreted as the maximum, which the 3-D woven fabric could cost and result in a blade, which was essentially equal in cost to the baseline blade. For each composite modulus of elasticity, the best configuration as defined in Table 4 was employed.

3-D woven Economics, Relative to the Resin Infusion Baseline

The baseline blade is a wet hand lay-up construction, with fiber volume fractions of approximately 43%. This is not a very fair comparison; because the 3-D woven concept is intended in a combination with the resin infusion process. Indeed, part of the benefit of the 3-D woven reflected in Table 5 is the higher fiber volume fraction attainable through the resin infusion and thus assumed in modeling the 3-D woven composites. It is possible, however, that the present blade could also be fabricated using resin infusion processes, resulting in a higher fiber volume fraction. Therefore, Table 6 reflects the same data as Table 5 compared instead to a resin infusion baseline blade. These numbers are much more aggressive.

The cost sensitivity columns in Tables 5 and 6 also require some explanation. The figures listed in these columns are a measure of the percentage by which the total blade cost would be reduced for every $/kg or $/lb by which the cost of the dry fabric is reduced. If, for example, 3TEX were to develop a glass/carbon hybrid 3-D woven with an average fiber density of 2.2 g/cc and a modulus such that the stiffness of a composite of 55% fiber volume fraction is approximately 13 Msi, then one could reference Table 4 and determine that the maximum economical cost of the dry fabric—in order to compete with the resin-infused baseline blade—is approximately $11/kg. If instead 3TEX can produce the material for $10/kg., then the cost sensitivity columns would indicate that 3TEX could expect to reduce the overall blade cost by an addition 1.25%. If the material could be produced for $9/kg, then the blade cost would be reduced by 2.5%.

In all of the cost modeling, labor costs were assumed fixed. No labor savings is taken into account for using either the single-piece 3-D woven spar caps or resin infusion processes. These labor savings have not been defined at present. Any savings in labor realized would result in a reduction in blade cost or could be transferred to a corresponding increase in the fiber material costs listed in Tables 5 and 6.

TABLE 5

Summary of Economics of 3-D woven Material, Compared to the Wet Hand Layup Baseline GE37a Blade

| Composite Stiffness in the Warp Direction | | Maximum Economical Volumetric Cost of the Fibers | | Maximum Economical Cost of the Cloth, $P_{cloth}$ for Average Fiber Densities of | | | | |
|---|---|---|---|---|---|---|---|---|
| $E_{11,composite}$ | | $P_{cloth} \cdot \rho_{fiber}$ | | 1.8 g/cc | 2.0 g/cc | 2.2 g/cc | 2.4 g/cc | 2.6 g/cc |
| GPa | Msi | $/m³ | $/in³ | | | $/kg | | |
| 113 | 16.4 | $39,203 | $0.642 | $21.78 | $19.60 | $17.82 | $16.33 | $15.08 |
| 89 | 13.0 | $29,819 | $0.489 | $16.57 | $14.91 | $13.55 | $12.42 | $11.47 |

TABLE 5-continued

Summary of Economics of 3-D woven Material, Compared to the Wet Hand Layup Baseline GE37a Blade

| 67 | 9.8 | $20,759 | $0.340 | $11.53 | $10.38 | $9.44 | $8.65 | $7.98 |
| 45 | 6.6 | $11,800 | $0.193 | $ 6.56 | $ 5.90 | $5.36 | $4.92 | $4.54 |
| 34 | 5.0 | $ 7,415 | $0.122 | $ 4.12 | $ 3.71 | $3.37 | $3.09 | $2.85 |

| Maximum Economical Cost of the Cloth, $P_{cloth}$ for Average Fiber Densities of | | | | | | |
|---|---|---|---|---|---|---|
| 1.8 g/cc | 2.0 g/cc | 2.2 g/cc | 2.4 g/cc | 2.6 g/cc | Cost Sensitivity | |
| $/lb | | | | | %/($/kg) | %/($/lb) |
| $9.90 | $8.91 | $8.10 | $7.42 | $6.85 | 0.80%–1.16% | 1.77%–2.55% |
| $7.53 | $6.78 | $6.16 | $5.65 | $5.21 | 1.03%–1.49% | 2.27%–3.28% |
| $5.24 | $4.72 | $4.29 | $3.93 | $3.63 | 1.40%–2.02% | 3.08%–4.45% |
| $2.98 | $2.68 | $2.44 | $2.23 | $2.06 | 2.23%–3.23% | 4.91%–7.10% |
| $1.87 | $1.69 | $1.53 | $1.40 | $1.30 | 3.09%–4.46% | 6.79%–9.81% |

All 3-D woven Designs assume a fiber volume fraction of 55%; Costs and Cost Sensitivities are based upon the design of the GE37a blade.

TABLE 6

Summary of Economics of 3-D woven Material, Compared to a Resin Infused Baseline GE37a Blade

| Composite Stiffness in the Warp Direction | | Maximum Economical Volumetric Cost of the Fibers | | Maximum Economical Cost of the Cloth, $P_{cloth}$ for Average Fiber Densities of | | | | | Maximum Economical Cost of the Cloth, $P_{cloth}$ for Average Fiber Densities of | | | | |
|---|---|---|---|---|---|---|---|---|---|---|---|---|---|
| $E_{11\,composite}$ | | $P_{cloth} \cdot \rho_{fiber}$ | | 1.8 g/cc | 2.0 g/cc | 2.2 g/cc | 2.4 g/cc | 2.6 g/cc | 1.8 g/cc | 2.0 g/cc | 2.2 g/cc | 2.4 g/cc | 2.6 g/cc |
| GPa | Msi | $/m³ | $/in³ | $/kg | | | | | $/lb | | | | |
| 113 | 16.4 | $32,094 | $0.526 | $17.83 | $16.05 | $14.59 | $13.37 | $12.34 | $8.10 | $7.29 | $6.63 | $6.08 | $5.61 |
| 89 | 13.0 | $24,238 | $0.397 | $13.47 | $12.12 | $11.02 | $10.10 | $ 9.32 | $6.12 | $5.51 | $5.01 | $4.59 | $4.24 |
| 67 | 9.8 | $16,673 | $0.273 | $ 9.26 | $ 8.34 | $ 7.58 | $ 6.95 | $ 6.41 | $4.21 | $3.79 | $3.44 | $3.16 | $2.91 |
| 45 | 6.6 | $ 9,242 | $0.151 | $ 5.13 | $ 4.62 | $ 4.20 | $ 3.85 | $ 3.55 | $2.33 | $2.10 | $1.91 | $1.75 | $1.62 |
| 34 | 5.0 | $ 5,562 | $0.091 | $ 3.09 | $ 2.78 | $ 2.53 | $ 2.32 | $ 2.14 | $1.40 | $1.26 | $1.15 | $1.05 | $0.97 |

All 3-D woven Designs assume a fiber volume fraction of 55%; Costs and Cost Sensitivities are based upon the design of the GE37a blade.

Spar Cap Material Properties:

The predicted modulus was calculated on the basis of a total fiber volume fraction in the composite of 55% using 3TEX's stiffness averaging model. The predicted composite modulus values, and some important preform properties, including fabric price per pound for all the spar cap materials, are given in Table 7.

TABLE 7

Predicted Properties and Estimated Price for All Spar Cap Fabrics

| Product ID | Picks per Inch | Fabric Weight oz/yd² | Fabric Density g/cc | Calculated $E_{11}$ Gpa | | Fabric Price $/lb |
|---|---|---|---|---|---|---|
| | | | | Modar 865 | Jeffco 1401 | |
| P3W-HX050 | 2.5 | 151.8 | 1.85 | 118.06 | 119.19 | 8.90 |
| P3W-HX049 | 3 | 154.8 | 1.87 | 116.52 | 117.69 | 9.00 |
| P3W-HX048 | 3.5 | 157.7 | 1.87 | 114.97 | 116.19 | 9.00 |
| P3W-HX047 | 4 | 160.7 | 1.89 | 113.54 | 114.80 | 9.00 |
| P3W-HX046 | 5 | 166.7 | 1.91 | 110.76 | 112.09 | 9.20 |
| P3W-HX052 | 3 | 176.7 | 2.15 | 82.75 | 83.93 | 5.33 |
| P3W-HX053 | 4 | 182.6 | 2.16 | 80.77 | 82.04 | 5.27 |
| P3W-HX054 | 3 | 176.7 | 2.15 | 82.75 | 83.93 | 5.33 |
| P3W-HX055 | 4 | 182.6 | 2.16 | 80.77 | 82.04 | 5.27 |
| P3W-HX056 | 3 | 191.2 | 2.35 | 60.36 | 61.54 | 3.41 |
| P3W-HX057 | 4 | 197 | 2.34 | 58.96 | 60.23 | 3.48 |

Composite panels were made using two different resins, the first is an epoxy resin (Jeffco Epoxy System # 1401 R-12, cured at room temperature) and the second is vinyl ester (Ashland MODAR® 865, post cured at 140° F.). All composite panels were made using vacuum infusion.

Based on the design of the preforms and the resin properties provided by the manufacturers, tensile modulus $E_{11}$ was calculated using 3TEX's stiffness averaging model. From Table 8 and FIG. 6, it can be seen that the measured modulus values are higher than those predicted using our model. It is worth noting here that these measured modulus values are also higher than those expected, thus producing surprising results with embodiments of the present invention.

TABLE 8

Spar Cap Composite Material Tensile Modulus

| Product ID | Thickness Inch | $E_{11}$, Gpa Jeffco 1401 | | $E_{11}$, Gpa Modar 865 | |
|---|---|---|---|---|---|
| | | Calculated | Measured | Calculated | Measured |
| P3W-HX050 | 0.189 | 119.19 | 122.80 | 118.06 | 133.48 |
| P3W-HX049 | 0.194 | 117.69 | 121.21 | 116.52 | 127.27 |
| P3W-HX048 | 0.187 | 116.19 | 125.90 | 114.97 | * |
| P3W-HX047 | 0.193 | 114.80 | 130.24 | 113.54 | 125.44 |
| P3W-HX046 | 0.201 | 112.09 | 116.66 | 110.76 | * |
| P3W-HX052 | 0.211 | 83.93 | 88.05 | 82.75 | 86.51 |
| P3W-HX053 | 0.229 | 82.04 | 86.19 | 80.77 | 85.01 |
| P3W-HX054 | 0.201 | 83.93 | 77.64 | 82.75 | * |
| P3W-HX055 | 0.229 | 82.04 | 85.15 | 80.77 | 80.40 |

TABLE 8-continued

Spar Cap Composite Material Tensile Modulus

| Product ID | Thickness Inch | $E_{11}$, Gpa Jeffco 1401 | | $E_{11}$, Gpa Modar 865 | |
|---|---|---|---|---|---|
| | | Calculated | Measured | Calculated | Measured |
| P3W-HX056 | 0.206 | 61.54 | 60.74 | 60.36 | * |
| P3W-HX057 | 0.223 | 60.23 | 66.05 | 58.96 | 63.52 |

Figure 6:
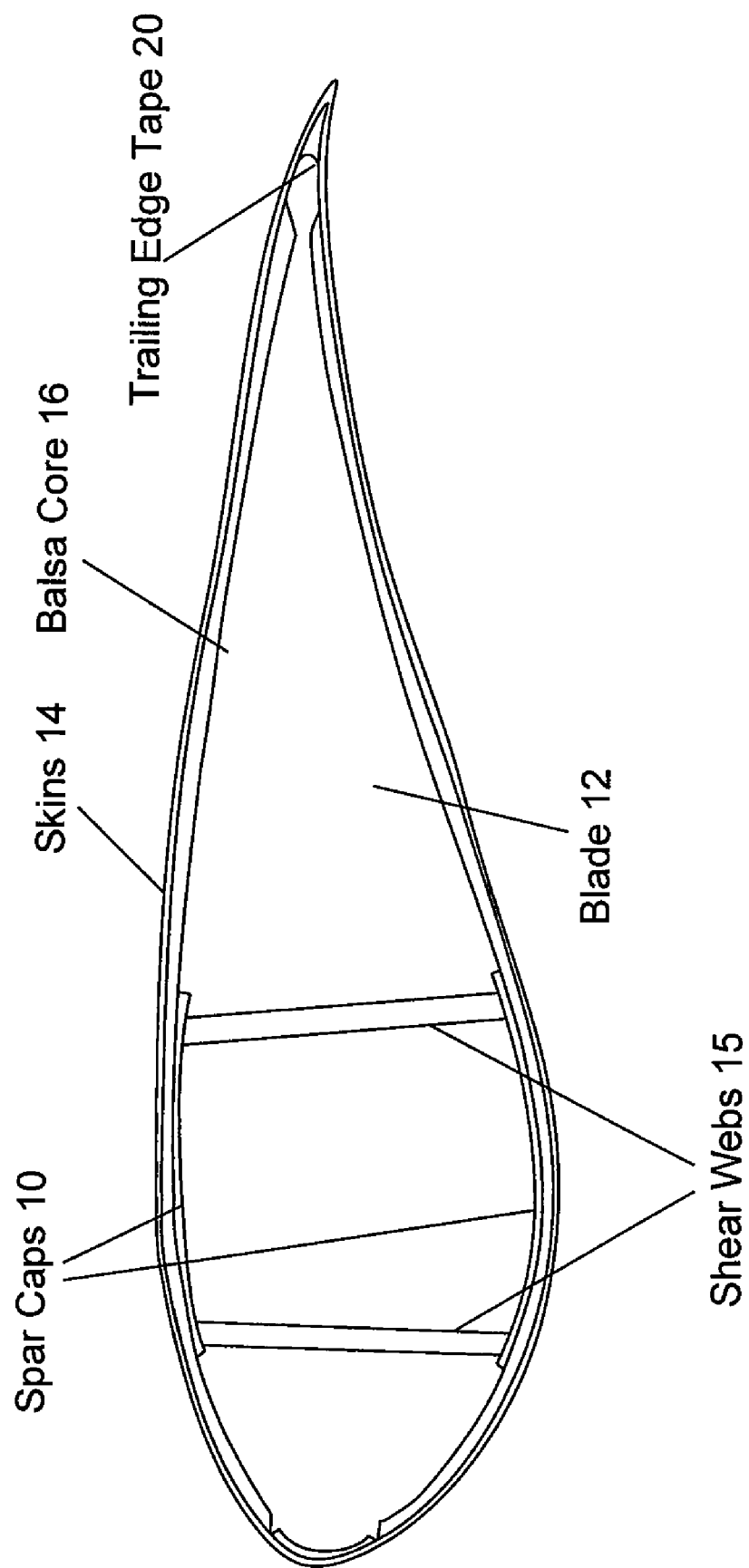
FIG. 6 shows a side view of a spar cap and wind blade constructed according to one embodiment of the present inventions.
Figure 7:
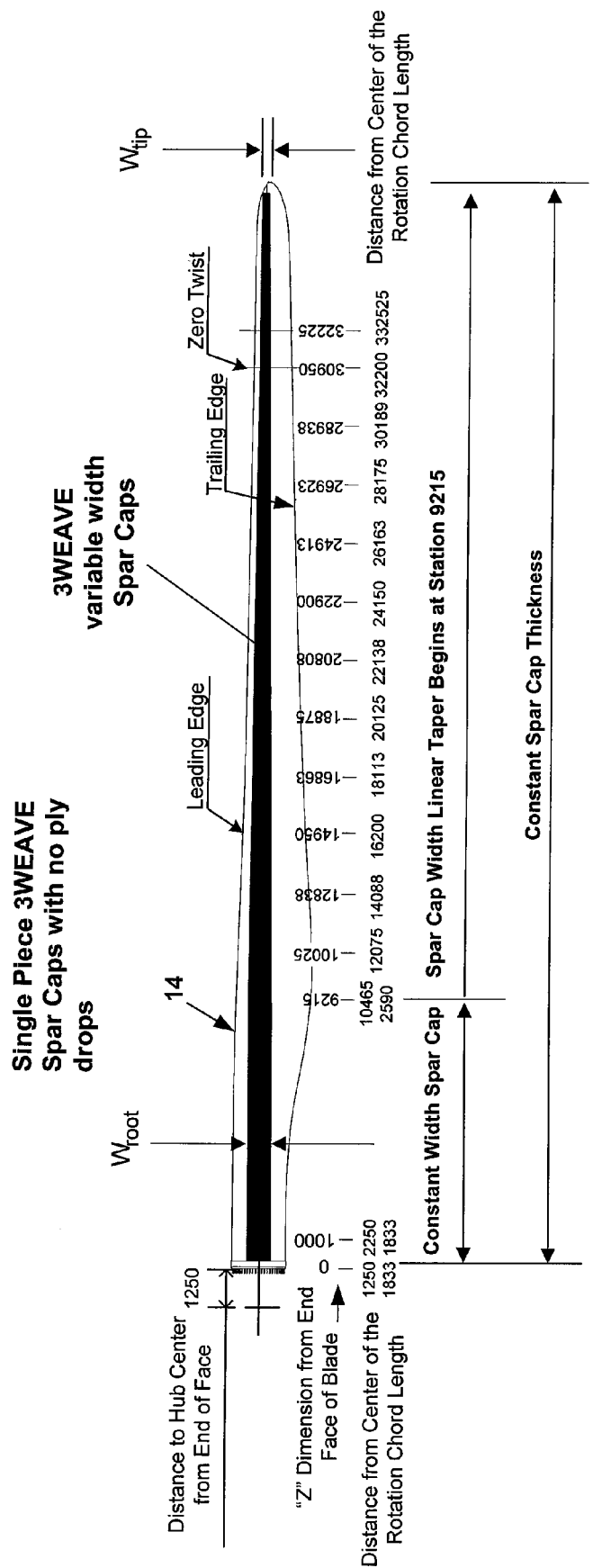
FIG. 7 schematically represents a cross section of the wind blade showing the spar cap within the skin.
Figure 8:
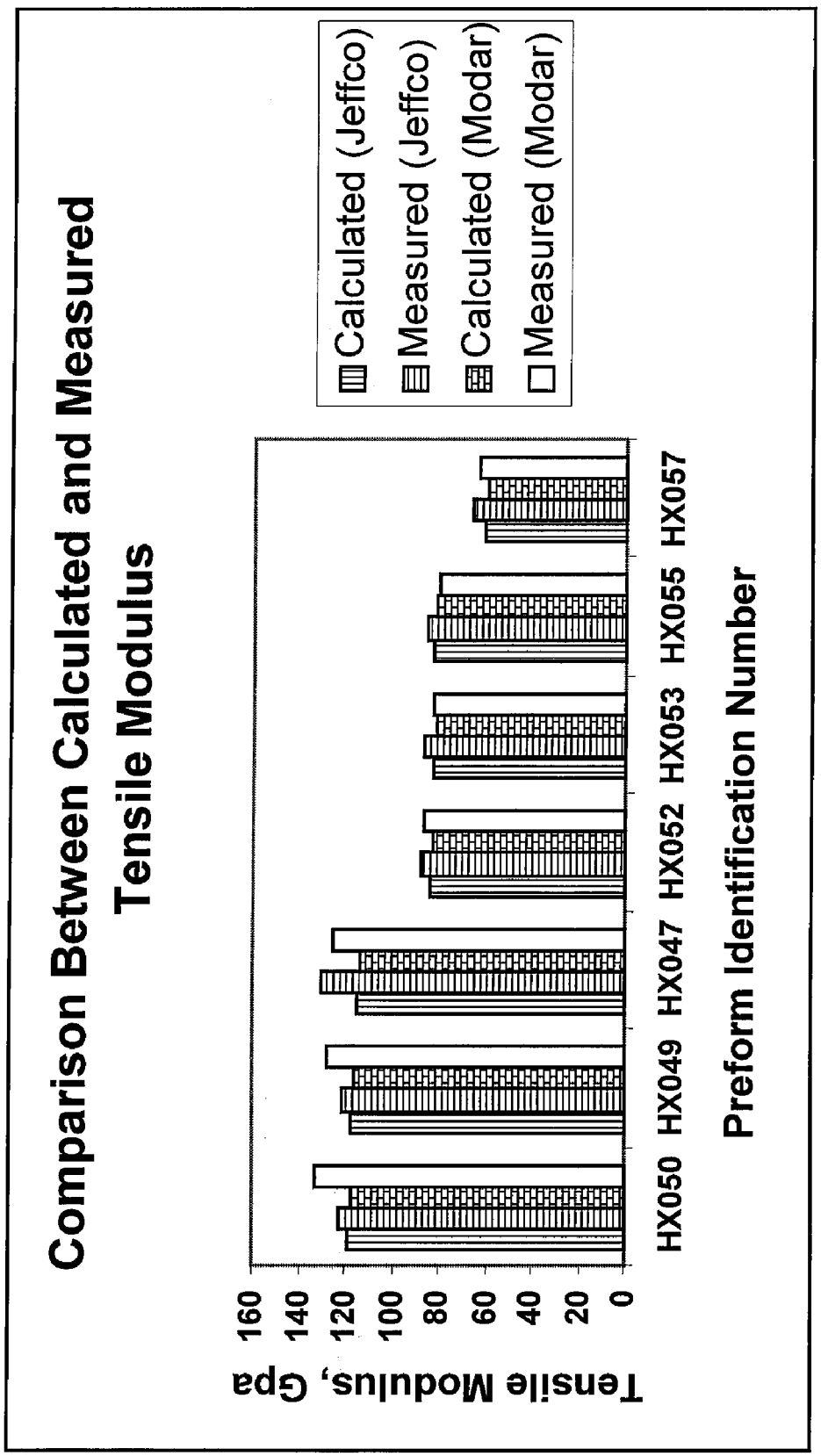
FIG. 8 graphically compares calculated and measured tensile modulus.

*Based on test results, these specimens were given a low priority for having limited contribution FIG. 6. Comparison Between Calculated and Measured Tensile Modulus Fatigue testing of the 3-D composite materials was attempted at two universities, Wichita State University and University of Nebraska. In both cases, they encountered significant difficulties in breaking the material because of the high thickness and high strength. It appeared that new specimen design and test procedure are needed for proper testing of the thick 3-D woven materials.

The ability of 3-D woven skin material to reduce blade weight and cost was examined. The analysis started with the optimized 3-D woven constant thickness spar cap design with a composite $E_{11}$ of 16.4 Msi, a spar cap root width of 750 mm, and a spar cap tip width of 100 mm. The glass skins of the present blade outboard of z=1000 mm were replaced with 3-D woven. Again, a fiber volume fraction of 55% was assumed, and a 3-D woven composite thickness of 0.08 inch was employed. The spar cap thickness and the skin thickness distribution were simultaneously adjusted to minimize the blade weight. The only design driver for this exercise was blade tip deflection.

Two candidate materials were examined, the properties of which were intended to approximate the properties of the following two materials: 45/45/10% glass/carbon hybrid 3-D woven with approximately equal volume of carbon warp and glass fill and about 10% of fibers in the z direction. 45/45/10% glass/carbon hybrid 3-D Woven with half glass and half carbon warp and all glass fill and about 10% of the fibers in the z direction.

These materials were examined each in two different ways. First, it was assumed that half of the glass biaxial material, and all the unidirectional glass material, were replaced by the 3-D woven skins. Next, it was assumed that all of the glass skin was replaced by 3-D woven. Table 9 summarizes the results.

These results are encouraging and suggest that if the torsional stiffness requirements can be relaxed by half, that the weight and cost savings from replacing part of the skins with stiffer, lighter skin material might be significant. It should be noted, however, that an extensive analysis of torsion modes was not conducted in the present study, and this approach cannot be recommended without further study.

It may not be possible to replace all of the glass multi-axial material in the skin. The 3-D woven material, with only warp, fill, and Z fibers may not provide the level of $G_{12}$ required for minimal torsional rigidity of the blade. If some reduction of the torsional requirement is acceptable, the weight of the baseline 3-D woven model would be reduced by 25%, with a 10% reduction in cost. That would beat the best result shown in Table 9.

A better understanding of 3-D woven material shear modulus and shear strength combined with a more detailed analysis of the blade design would be necessary to fully appreciate the role of 3-D woven in the skins.

Variable Density Balsa

The analysis of shear deformation in the sandwich structure utilizing variable density balsa and 3-D woven skins in the outboard sections of the blade, can be handled through finite element modeling and application of 3TEX in-house analysis tools.

Although, balsa accounts for less than 4% of the weight of the blade and less than 3% of its cost, it is possible that, owed to the new spar cap design, low thickness and low density balsa can be used leading to a substantial reduction in blade weight.

EMBODIMENTS HAVING 3-D WOVEN SKIN FABRICS

For the skin material three designs were used, the first is a standard E-glass 3-D woven balanced x-y fabric, 77 oz/yd². The second is a standard quasi-unidirectional fabric 64 oz/yd² E-glass. And the third is a carbon/glass hybrid based on the 77 oz/yd², where the glass filling is replaced with equal weight of carbon. Table 10 shows the details of these three designs.

The two standard E-glass products are currently used by a number of boat manufacturers. The main difference between the aforementioned is that the 64 oz/yd² is not a balanced fabric as compared to the 77 oz/yd². Table 10 gives properties and price for the above three materials. The results of tests in Table 11 show 3-D woven materials'

TABLE 9

Summary of 3-D woven Skins Studies

| Composite Stiffness in the Warp Direction $E_{11,composite}$ | | 50% of Glass Skins Remain | Weight Reduction Relative to the 3WEAVE Baseline | Weight Reduction Relative to the Wet Hand Layup Baseline* | Assumed Cost $/kg | Cost Reduction Relative to the 3WEAVE Baseline |
|---|---|---|---|---|---|---|
| GPa | Msi | | | | | |
| 58 | 8.4 | Yes | 17% | 45% | $8.20 | 6% |
| 58 | 8.4 | No | 24% | 50% | $8.20 | 7% |
| 30 | 4.4 | Yes | 12% | 42% | $6.20 | 4% |
| 30 | 4.4 | No | 15% | 44% | $6.20 | 5% |

*Cumulative Reduction due to both the 3WEAVE Spar Caps and Skins
Spar Caps are assumed to be of 113-Gpa 3WEAVE with 750-mm root width and 100-mm tip width.

superiority over the warp knit material style # 1708 made by Fiber Glass Industries, Inc. for the two balsa densities. It can be seen that the 3-D woven material results in a higher peak load and modulus than the warp knit sandwich. Deflection at 100 lbs load is much lower for the 3-D woven sandwich material than that of the warp knit material. The modulus values obtained were much higher than those of Table 9, which points out to the possibility of using even lighter weight 3-D woven materials than the 64 oz/yd$^2$. A 54 oz/yd$^2$ or even a 31 oz/yd$^2$, which are also standard 3-D woven E-glass products, will be sufficient to provide the skin to the balsa.

TABLE 10

3-D woven Wind Blade Skin Fabrics

| Product ID | Weight Oz/yd$^2$ | Thickness Inch | Total $V_f$ % | Warp | Fill Carbon | Glass | Z | Fabric Cost $/lb. |
|---|---|---|---|---|---|---|---|---|
| P3W-GE051 | 64.0 | 0.07 | 47.3 | 72.0 | 0 | 24 | 4.0 | 1.95 |
| P3W-GE041 | 77.0 | 0.08 | 48.0 | 49.2 | 0 | 49 | 1.8 | 1.95 |
| P3W-HX051 | 77.4 | 0.10 | 50.2 | 47.8 | 47.5 | 0 | 4.7 | 6.43 |

TABLE 11

Baltek Test results: Flexural, ASTM C393 Flex 4 Points

| Product ID | Direction | Laminate Thickness Inch | Lb./ft$^2$ | Peak load Lb. | Deflect at 100 lb. Inch | Modulus Gpa |
|---|---|---|---|---|---|---|
| Balsa core: S 67 | | | | | | |
| P3W-GE041 | L | 1.159 | 2.765 | 2068.3 | 0.696 | 10.21 |
| Glass | W | 1.174 | 2.879 | 2085.2 | 0.574 | 11.55 |
| P3W-HX051 | L (glass) | 1.180 | 2.732 | 2002.1 | 0.665 | 9.49 |
| Hybrid | W (carbon) | 1.180 | 2.724 | 2238.7 | 0.311 | 21.28 |
| P3W-GE051 | L | 1.133 | 2.384 | 1963.6 | 0.559 | 10.54 |
| Glass | W | 1.133 | 2.379 | 1690.3 | 1.080 | 6.75 |
| Warp Knit | L | 1.107 | 2.155 | 1419.2 | 1.645 | 5.26 |
| 1708 | W | 1.109 | 2.153 | 1539.5 | 1.583 | 5.47 |
| Balsa core: B2K-100 | | | | | | |
| P3W-GE041 | L | 1.175 | 3.21 | 2186.3 | 0.697 | 10.53 |
| Glass | W | 1.175 | 3.22 | 2313.3 | 0.614 | 11.84 |
| P3W-HX051 | L (glass) | 1.184 | 3.07 | 2335.8 | 0.745 | 9.63 |
| Hybrid | W (carbon) | 1.180 | 3.04 | 2442.6 | 0.329 | 22.05 |
| P3W-GE051 | L | 1.133 | 3.31 | 2349.5 | 0.638 | 12.84 |
| Glass | W | 1.137 | 2.70 | 1587.2 | 0.989 | 6.71 |
| Warp Knit | L | 1.107 | 2.48 | 1530.7 | 1.678 | 5.44 |
| 1708 | W | 1.108 | 2.50 | 1499.1 | 1.740 | 5.44 |

L = length direction (warp)
W = width direction (filling)

The wetting of the carbon fibers with resin was not complete and this led to poor bonding between the fabric and the balsa where sandwich construction is used, which resulted in the tensile strength of the 3-D woven fabric with carbon hybrid to be lower than the glass materials. Adding carbon fiber to the skin fabric also increased the cost of the fabric substantially. This is demonstrated in Table 10. Compression strength of the 3-D woven glass materials is better than that of the multi-axial warp knit fabric.

TABLE 12

Baltek 3-D woven Skin testing
Edgewise Compression ASTM C364 and Tension ASTM C297
Adhesive: 3M DP two-part epoxy

| Product ID | Direction | Compression Strength, psi S 67 Balsa | Compression Strength, psi D-100 Balsa | Tensile Strength, psi S 67 Balsa | Tensile Strength, psi D-100 Balsa |
|---|---|---|---|---|---|
| P3W-GE041 | W | 323.9 | 363.7 | 870.8 | 1315.2 |
| Glass | L | 451.8 | 495.2 | | |
| P3W-HX051 | W (carbon) | 368.6 | 481.9 | 699.5 | 895.9 |
| Hybrid | L (glass) | 367 | 329.8 | | |
| P3W-GE051 | W | 564.3 | 533.9 | 1020.6 | 1235.1 |
| Glass | L | 500.3 | 527.9 | | |
| Warp Knit 1708 | W | 273.2 | 290.4 | 1010.5 | 1448.2 |
| | L | 273.6 | 294.6 | | |

The results of testing for embodiments of the present invention confirm that 3-D woven carbon-glass hybrid materials offer a solution to large blades resulting in weight reduction and improved resin infusion proccessability. Furthermore, these embodiments and materials are effective for providing improvements in building large blades.

The design of a spar cap according to an embodiment of the present invention using a single piece of 3-D woven fabric with constant thickness and variable width, simplifies the manufacturing process by eliminating the need for lamination of a large number of layers and the dropping of plies to reduce the stiffness toward the tip of the blade, which could be sites for stress concentrations. The hybrid design selected avoids mixing glass and carbon in the same direction, which reduces the thickness of the spar cap and in turn the blade weight. A preferred design and construction of the present invention has 100% carbon warp with 100% glass filling and Z.

For a 37-m blade designed for IEC Class IIA conditions, a spar cap root width between 750 and 1,000 mm is most cost effective over the entire range of composite stiffness values examined (5 to 16.4 Msi). The cost is not terribly sensitive over a range of 250 mm either side of the optimal. The results are negligibly sensitive to the spar cap tip width over the range from 75 to 200 mm.

A spar cap material stiffness of 16 Msi, which exceeded initial testing phases, results in weight reduction of between 30 and 33% compared to the baseline hand lay-up blade. Weight reductions relative to the resin infused baseline blade of between 20% and 25% are also attainable.

Using 3-D woven E-glass material for all or part of the skins results in substantial reductions, i.e., 10-20%, in blade mass, relative to the already lighter 3-D woven baseline blade, with cost reductions between 4% and 7%. In another embodiment of the present invention, variable density balsa combined with the new blade design, which result in substantial weight and cost savings.

The results presented above clearly demonstrate the advantage of using 3-D woven materials in the spar cap in embodiments of the present invention. In a preferred embodiment according to the present invention, the design of a single piece spar cap with constant thickness would eliminates the need to drop plies in the laminate in moving from the root of the blade towards the tip. Instead, the reduction in stiffness is achieved by reducing the width along the length of the spar. Weaving one preform and cutting it into two pieces, one for the upper and one for the lower spar caps also substantially reduce the cost of the material. This method and product also simplifies the resin infusion process to manufacture of the blade, which leads to improved resin distribution throughout the material for improved uniformity, decreased processing time, and a corresponding additional labor savings. The use of 3-D woven skins in conjunction with variable density balsa core with this new spar design may also result in blade weight reduction through reducing the thickness and density of the balsa. In both applications of the thick 3-D woven materials, uniformity of thickness and properties would substantially improve the quality of the blade.

Embodiments of the present invention provide for products and methods of manufacture and use for alternatives, including but not limited to: a single-piece with constant thickness and variable width, integral 3-D Woven Carbon/Glass Hybrid Spar Cap; a 3-D woven Glass skin/variable density balsa core sandwich component; and combinations thereof, all of which reduce rotor blade weight and manufacturing cost.

Computational models of the spar cap may be provided such that thickness of the spar cap could be readily modified in order to optimize the geometry, and also allow the possibility of incorporating materials other than 3-D woven, in case some local stiffening or strengthening can be provided, as well as being built so that including a variety of materials could modify the skin composition.

The details of materials for the spar cap design example, identified in early phases of testing of the present invention, are included in Table 13. At this point, the materials woven are about 0.5 inch thick in order to provide a finished composite thickness of 0.4 inch, and thus to match sample number 8 in Table 6. Fabric may be produced in various widths, in one example embodiment approximately about 30 inches wide, which is cut into two identical pieces, one for the top and one for the bottom spar cap of the present invention, which provides for two tapered pieces to be applied with the width decreasing from the root to the tip of the blade.

TABLE 13

Spar Cap Materials Examples

| Product ID | Fabric Areal Weight Oz/yd² | Fabric Thickness Inch | Fabric Density g/cc | Calculated Composite Modulus $E_{11}$ Gpa, Modar 865 | Gpa, Jeffco 1401 | Fabric Cost $/lb. |
|---|---|---|---|---|---|---|
| P3W-HX-MS3 | 303.8 | 0.455 | 1.86 | 118.1 | 119.2 | 9.25 |
| P3W-HX-MS4 | 313.0 | 0.460 | 1.87 | 115.7 | 116.9 | 9.25 |

A 54 oz/yd² or 31 oz/yd² 3-D woven E-glass fabric is one example embodiment for use as the skin preform. Alternatives, such as composite sandwich panels can be fabricated and used to evaluate the torsional behavior of the optimized sandwich construction, depending on blade design, application and implementation specifics. Also, alternatively, a multi-axial warp knit layer may be used to improve the torsional rigidity.

Spar cap components, sandwich panels, and structural joint elements will vary based upon blade requirements as well, but preferably include at least one 3-D woven or multi-axial construction having a constant thickness and variable width, with the width decreasing from root to tip of the blade.

A 20-ft sub-scale tapered spar with integrated shear was fabricated using resin infusion process as one embodiment of the present invention. Testing of the spar cap box example included static evaluation of the 20-ft sub-scale spar box including deflections, twist/flap characterization, in plane and out-of-plane stiffness, limit-load in two direction and strain verification. A prototype blade including the spar cap of the present invention was designed to apply to either a 34 m or 37 m blade, using the optimized designs and resin infusion process.

Certain modifications and improvements will occur to those skilled in the art upon a reading of the foregoing description. By way of example, cutting, handling, and transporting the thick, long and heavy materials may be done at a remote location from the blade manufacturing, or a 3D weaving machine may be provided at or near the location of blade manufacturing. All modifications and improvements have been deleted herein for the sake of conciseness and readability but are properly within the scope of the following claims.

What is claimed is:

1. A wind blade spar cap for strengthening a wind blade comprising:
   an integral, unitary three-dimensional woven material having a first end and a second end, corresponding to a root end of the blade and a tip end of the blade, wherein the material tapers in width from the first to the second end while maintaining a constant thickness and decreasing weight therebetween, the cap being capable of being affixed to the blade for providing increased strength with controlled variation in weight from the root end to the tip end based upon the tapered width of the material thereof.

2. The spar cap of claim 1, wherein the material comprises carbon fibers.

3. The spar cap of claim 1, wherein the material comprises E-glass filaments.

4. The spar cap of claim 1, wherein the material is a hybrid of carbon and E-glass filaments.

5. The spar cap of claim 1, wherein the material is resin-infused.

6. The spar cap of claim 1, wherein the 3-D woven structure includes 3-D orthogonal yarn systems.

7. The spar cap of claim 1, wherein the cap is affixed to the blade by infusion.

8. The spar cap of claim 1, wherein the material substantially comprises warp yarns in the spar cap length direction.

9. A method of making a wind blade spar cap comprising the steps of:
   providing a plurality of yarn systems for supplying input to a weaving machine;
   introducing the yarn to the machine for manipulation in each of x-, y-, and z-directions, where the directions produce intersecting points;
   forming an integral, unitary three-dimensional woven material having a predetermined, controlled and constant thickness from the yarn where the x- and y-direction yarns are disposed to each other without interlacing, and where the z-direction yarns are manipulated to secure the x- and y-direction yarns in respective planes;
   cutting the material to form a tapered spar cap section;
   applying the tapered section to a wind blade spar such that the taper direction of the section decreases from a root end of the blade to a tip end of the blade.

10. The method of claim 9, further including the step of introducing a resin to the section during application to the blade.

11. The method of claim 9, wherein the step of cutting the material to form a tapered spar cap section is performed by cutting the material into two identical pieces.

12. The method of claim 11, wherein the step of applying one identical piece of the tapered section to the spar further comprises the step of applying the other identical piece of the tapered section such that the taper direction of the section decreases from a root end of the blade to a tip end of the blade.

13. A wind blade comprising:
   a spar cap further comprising an integral, unitary three-dimensional woven material having a first end and a second end, corresponding to a root end of the blade and a tip end of the blade, wherein the material tapers in width from the first to the second end while maintaining a constant thickness and decreasing weight therebetween, the cap being capable of being affixed to the blade for providing increased strength with controlled variation in weight from the root end to the tip end based upon the tapered width of the material thereof.

14. The spar cap of claim 13, wherein the cap is affixed to the blade by infusion.

15. The spar cap of claim 13, wherein the material substantially comprises warp yarns in the spar cap length direction.

\* \* \* \* \*

UNITED STATES PATENT AND TRADEMARK OFFICE
CERTIFICATE OF CORRECTION

PATENT NO. : 7,377,752 B2  Page 1 of 1
APPLICATION NO. : 11/522736
DATED : May 27, 2008
INVENTOR(S) : Mansour H. Mohamed It is certified that error appears in the above-identified patent and that said Letters Patent is hereby corrected as shown below:

Column 8, Line 21, "E1" should be --E11--

Column 21, Line 23, "eliminates" should be --eliminate--

Signed and Sealed this

Twenty-ninth Day of July, 2008

JON W. DUDAS
*Director of the United States Patent and Trademark Office*